Figure 1:
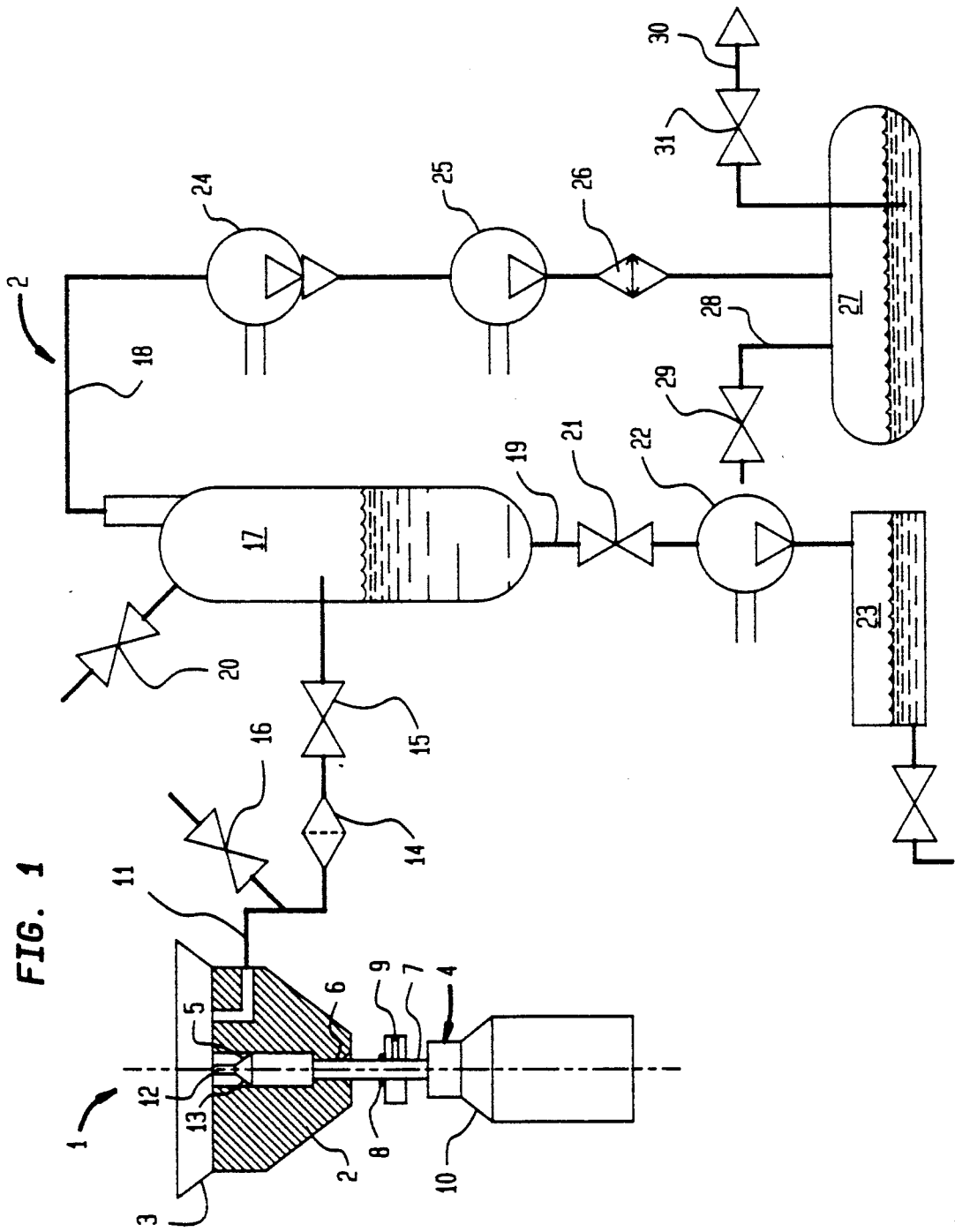

United States Patent [19]

Leemput et al.

[11] Patent Number: 5,067,514
[45] Date of Patent: Nov. 26, 1991

[54] APPARATUS FOR TAPPING A FLUID THROUGH A WALL

[76] Inventors: Geert H. Leemput, Dr. Bekenkampstraat 35, 9641 BR Veedam; Herman Leemput, Torenstraat 60, 9643 CV Wildervank, both of Netherlands

[21] Appl. No.: 573,349

[22] Filed: Aug. 24, 1990

[30] Foreign Application Priority Data

Aug. 25, 1989 [NL] Netherlands ............... 8902158

[51] Int. Cl.⁵ ............... F16L 41/04; B23B 41/08; F16K 43/00
[52] U.S. Cl. ............... 137/318; 62/149; 62/292; 62/475; 210/258; 210/295; 210/416.5; 222/5; 222/81
[58] Field of Search ............... 137/15, 315, 318; 62/77, 149, 292, 474, 475; 210/258, 295, 406, 416.5; 222/5, 80, 81

[56] References Cited

U.S. PATENT DOCUMENTS

| | | | |
|---|---|---|---|
| 2,875,777 | 3/1959 | Lacart | 137/318 |
| 3,232,070 | 2/1966 | Sparano | 62/292 |
| 3,252,475 | 5/1966 | Jones | 62/292 |
| 3,547,144 | 12/1970 | Mullins | 137/318 |
| 3,699,781 | 10/1972 | Taylor | 62/474 |
| 3,935,713 | 2/1976 | Olson | 62/292 |
| 4,285,206 | 8/1981 | Koser | 62/126 |
| 4,308,774 | 1/1982 | Bohle et al. | 83/100 |
| 4,476,688 | 10/1984 | Goddard | 62/475 |
| 4,646,527 | 3/1987 | Taylor | 62/292 |
| 4,747,961 | 5/1988 | Beer et al. | 210/406 |
| 4,809,515 | 3/1989 | Houwink | 62/149 |
| 4,856,289 | 8/1989 | Lofland | 62/149 |
| 4,862,699 | 9/1989 | Lounis | 62/292 |
| 4,909,042 | 3/1990 | Proctor et al. | 62/292 |
| 4,942,741 | 7/1990 | Hancock et al. | 62/292 |
| 4,967,570 | 11/1990 | Van Steenburgh, Jr. | 62/292 |

FOREIGN PATENT DOCUMENTS

| | | | |
|---|---|---|---|
| WO89/6336 | 7/1989 | European Pat. Off. | 62/292 |
| WO89/03963 | 5/1980 | PCT Int'l Appl. | |
| WO81/00756 | 3/1981 | PCT Int'l Appl. | |
| 2040426 | 8/1980 | United Kingdom | |

Primary Examiner—George L. Walton
Attorney, Agent, or Firm—Peter L. Michaelson

[57] ABSTRACT

An apparatus for tapping a fluid through a wall, comprising a vacuum source (24), a tapping head (1) provided at the front thereof with a circumferential seal (3) bounding a contact area, perforating means (4) to be brought into a position extending through the contact area, and at least one conduit (11, 111, and 211) communicating with the contact area for discharging air from the contact area enclosed by the seal (3) and for discharging fluid released. The invention provides an apparatus for easily and reliably tapping fluid that may be under excess pressure through a wall. In the contact area a reduced pressure can be generated by the vacuum source, resulting in that the tapping head is held against the wall and moreover no fluid can release into the atmosphere.

19 Claims, 2 Drawing Sheets

APPARATUS FOR TAPPING A FLUID THROUGH A WALL

This invention relates to an apparatus for tapping a fluid through a wall, comprising a vacuum source, a tapping head provided at the front thereof with a circumferential seal bounding a contact area, perforating means to be brought into a position extending through the contact area, and at least one conduit communicating with the contact area for discharging air from the contact area enclosed by the seal and for discharging fluid released.

Emissions of different fluids from discarded and/or defective apparatuses and tanks are environmentally harmful. Among other things, it is deemed undesirable to allow CFC gases from discarded heat pumps of, e.g., refrigerators, air-conditioners, and cooling vitrines to enter the atmosphere. Accordingly, the aim in the junking of these apparatuses is to tap and collect this gas. The tapping of the CFC gas, however, is impeded by the fact that such apparatuses occur in a large variety, so that it is very laborious to look for a suitable place for opening the cooling system and connecting a tapping apparatus. In nearly all cases, however, compressors of such apparatuses containing the CFC gas partially dissolved in compressor oil are accommodated in a casing having a wall with at least a substantially flat portion. In this connection it has been proposed for efficiently tapping and collecting the CFC gas to tap the gas and the oil through the wall of the casing. Accordingly, there is a special need for apparatuses for tapping a fluid that may be under excess pressure through a wall without the fluid entering the atmosphere. Such apparatuses may be used, e.g., for tapping fluids from tanks having, e.g., defective valves, and for tapping lubricants and refrigerants from motors.

The invention provides an apparatus for easily and reliably tapping fluid that may be under excess pressure through a wall.

The tapping head according to the invention can be placed with the front thereof against a wall through which a fluid is to be tapped. Since the vacuum source communicates with the contact area enclosed by the seal, a reduced pressure can be generated in this area, so that the tapping head is pressed against the wall and is thereby fixed in position. Subsequently, the wall can be perforated with the perforating means, after which the fluid can flow through the wall. The through-flow of the fluid can already be effected by excess pressure prevailing behind the wall and is anyhow further promoted by the above reduced pressure. Surprisingly, despite the filling of the vacuum in the contact area enclosed by the seal, the tapping head, when the fluid flows out, can remain pressed against the wall through the decrease of the pressure force exerted by the vacuum, as a result of the outflow of the fluid.

The invention further offers the advantage that it is not necessary for exerting the pressure force of the tapping head against the wall of a container to exert a reaction force on that container. Because of the large variety of shapes of the containers and their often hardly accessible locations, it is often laborious to hold them in order to cause such reaction forces to act.

It is a further advantage of the invention that it is ensured that no fluid escapes, since a reduced pressure prevails in the contact area enclosed by the seal.

An additional advantage of the apparatus according to the invention is that one vacuum source is sufficient, both for sucking the fluid and for discharging air to fix the tapping head in position.

According to a preferred embodiment of the invention the decrease of the pressure force generated by the vacuum, which decrease occurs when the fluid flows out, is controlled, because substantially in central position of the contact area an internal circumferential excess pressure seal bounding a discharge area is arranged in such a manner that it can be brought into a common sealing position contacting a wall with that seal, while the perforating means can be brought into a position extending through the discharge area, and a fluid discharge conduit communicates with the discharge area.

When fluid flows out after perforating a wall, an excess pressure can be formed in the discharge area, resulting in that a force away from the wall is exerted on the tapping head. By keeping the frontally projected surface of the discharge area relatively small with respect to the frontally projected surface of the contact area, the pressure force caused by the vacuum in the contact area remains sufficiently greater than the force away from the wall generated by the excess pressure temporarily prevailing in the discharge area.

Preferably, an air discharge conduit communicates with a portion of the contact area outside the discharge area. When fluid escapes along the excess pressure seal, it can be discharged through the air discharge conduit communicating with the contact area outside the discharge area, so that the vacuum is rapidly restored and no fluid can be released into the atmosphere.

The contact area and at least a space communicating therewith can form a buffer space for limiting the decrease of the vacuum when fluid flowed through the passage in the wall flows into that buffer space. The use of such a buffer space is advantageous both for limiting a decrease of the vacuum when fluid escapes along the excess pressure seal and for limiting the decrease of the vacuum when fluid flows out in case no separate excess pressure seal is used.

In order to avoid that fluid discharged through the air discharge conduit still enters the atmosphere, preferably both the air discharge conduit and the fluid discharge conduit are connected to the same fluid collecting system.

Preferably, a non-return valve is incorporated into the air discharge conduit, so that when as a result of the outflow of fluid the vacuum in the fluid discharge conduit and in the fluid collecting system decreases, the vacuum in the contact area of the tapping head is maintained. This ensures a continuous reliable attachment of the tapping head during tapping.

By arranging the perforating means for providing a passage in the wall that is very small as compared with the cross-section of the fluid discharge conduit, the flow rate of the outflow of fluid through the passage provided in the wall and thereby the decrease of the pressure force of the tapping head against the wall generated by the vacuum can be controlled. If a discharge area is provided, an unduly high pressure in the discharge area can be avoided by limiting the size of the passage.

By further arranging the perforating means for enlarging the passage in the wall, a fluid flow having a relatively high flow rate can be maintained when the excess pressure of fluid behind the wall has decreased.

Figure 2:
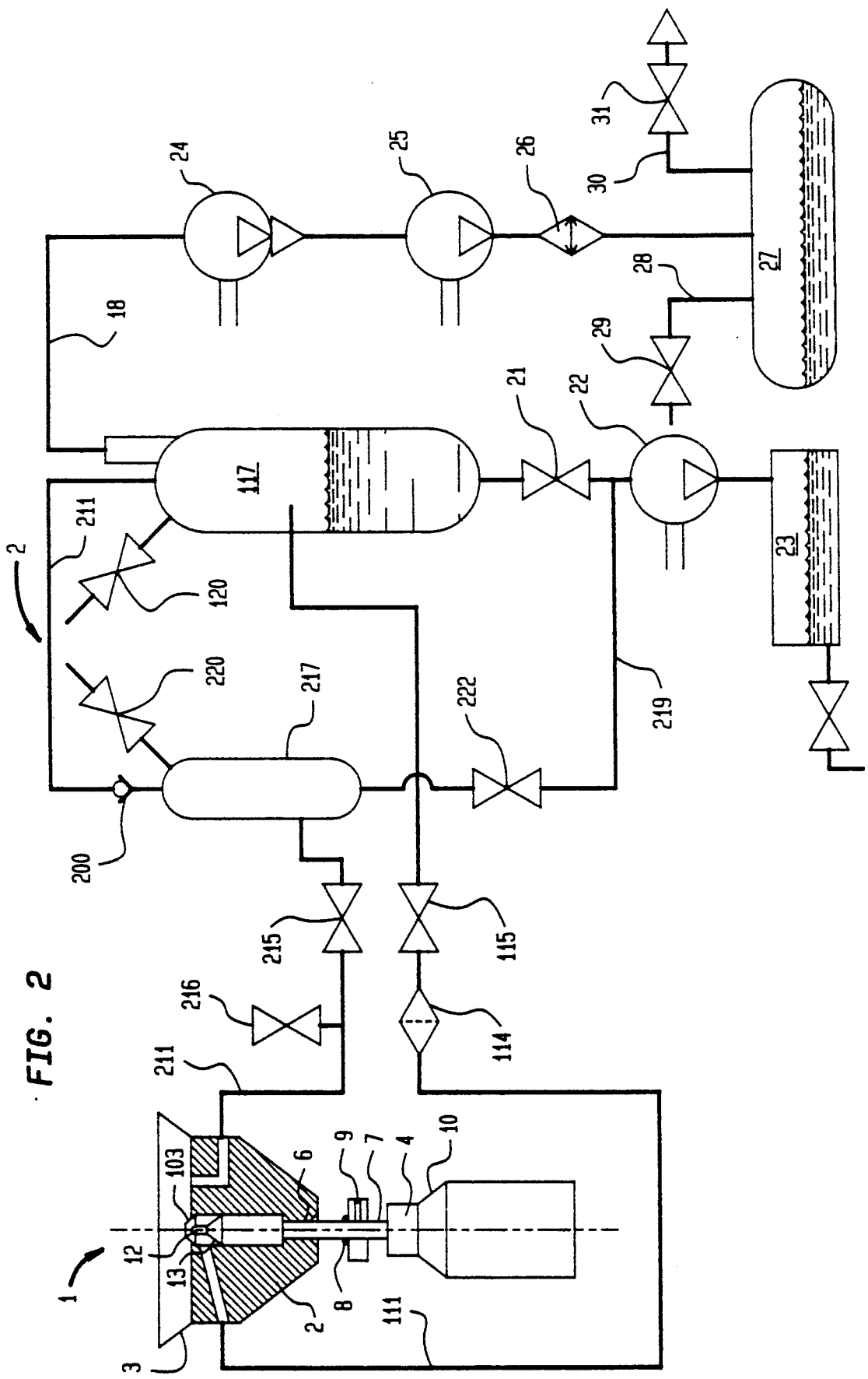

Two embodiments of the invention will now be illustrated and explained, by way of example, with reference to the accompanying drawings. In these drawings:

FIG. 1 is a schematic representation of an apparatus according to the invention, in which the tapping head is shown partly in cross-section, and FIG. 2 is a representation according to FIG. 1 of a second embodiment of the invention.

In the figures corresponding parts are indicated by the same reference numerals. Air as used in the following paragraphs is a gaseous mixture to be found in the atmosphere or a mixture having about the same properties.

FIG. 1 shows an apparatus according to the invention having a tapping head 1 and a processing part 2. The processing parts are designed to process CFC gas from heat pumps, especially refrigerators etc. For processing other fluids the tapping head 1 can be combined with a correspondingly accommodated processing part.

The tapping head 1 comprises a housing 2, at the top of which a circumferential seal 3 is mounted. Suspended in the housing 2 are perforating means 4 in the form of a drill 5, which is connected to a motor 10 by means of a shaft 7 extending through a shank 6 and mounting a sealing ring 8 and a stop ring 9. Extending through the housing 2 of the tapping head 1 is a conduit 11 connected to an area at the top of the tapping head enclosed by the sealing ring 3.

The drill 5 has a part 12 small in diameter and a part 13 having a diameter increasing from the free end.

The tapping head 1 is connected to the processing part 2 by means of the conduit 11. Incorporated into the conduit 11 is a filter 14 for collecting solids and a valve 15. The conduit 11 further communicates with an aeration valve 16.

The conduit 11 opens into a separation tank 17. Connected to the separation tank 17 are a gas discharge conduit 18 and an oil discharge conduit 19, and the tank 17 communicates with an aeration valve 20. The oil discharge conduit 19 contains a valve 21 and an oil pump 22 and opens into an oil reservoir 23.

The gas discharge conduit 18 contains a vacuum pump 24, a compressor 25, and a cooler 26. The gas discharge conduit 18 opens into a pressure tank 27. Connected to the upper part of the pressure tank 27 is a blow-off conduit 28 with a valve 29, and connected to the lower part of the pressure tank 27 is a CFC discharge conduit 30 provided with a valve 31.

The operation of the apparatus according to the embodiment shown is as follows: the tapping head 1 can be placed with the seal 3 against a wall portion of a compressor tank or any other wall portion. By opening the valve 15 a partial vacuum is generated by the vacuum pump 24 in the area enclosed by the seal 3, resulting in that the tapping head 1 is pressed and held against the wall portion. With the part 12 of the drill 5 a small hole is drilled in the wall portion against which the tapping head 1 is held. As soon as a passage has been formed, fluid present in the tank escapes through that passage under the influence of excess pressure in the holder and reduced pressure in the area enclosed by the seal 3. Owing to the fact that the passage is small in cross-section and, moreover, the drill 5 is disposed in that passage, the flow rate of the fluid flowing through the passage is limited to control the decrease of the vacuum in the area enclosed by the seal 3. The decrease of the vacuum in that area is further limited by the evacuated volume of channels 11, 18 and tanks 17 located between the vacuum pump 24 and the tapping head 1, as well as by the power of the vacuum pump 24. The size of the passage, the vacuumized volume of lines 11, 18 and tanks 17 and the power of the vacuum pump should be attuned to each other in such a manner that the decrease of the vacuum is sufficiently limited to ensure the maintenance of a sufficiently high pressure of the tapping head 1 against the wall.

The fluid flowed through the passage is discharged to the separation tank 17 via the conduit 11 for discharging fluid and air, with the solid particles, such as chips formed during drilling, being collected in the solids filter 14. As soon as the fluid consisting of oil having dissolved therein CFC gas, gaseous CFC gas, and air is exposed to reduced pressure, the CFC gas dissolved in the oil will be released. Especially when it flows into the separation tank 17, foam is formed, with a large part of the CFC gas being released from the solution. In order to also enable further residues to be released from the oil, the oil is left for some time in the vacuumized separation tank. By the end of the fluid tapping step, when the valve 15 is closed, a greater vacuum may temporarily be applied in the separation tank to withdraw as much CFC gas as possible from the oil. A further possibility of removing the CFC gas from the oil consists in warming up the oil, for which residual heat from the cooler 26 may be used.

The gaseous CFC gas and the air are discharged via the gas discharge conduit 18 to the pressure tank 27 by the action of the vacuum pump 24 and, subsequently, the compressor 25. In the pressure tank, using the property of CFC gas applied in cooling systems that it is liquid at an elevated pressure, the CFC gas is separated from the air by pressurizing the mixture. By compressing the CFC gas and the air the temperature thereof is increased, which results in an increase in the condensation pressure of the CFC gas. Consequently, before the gaseous mixture flows into the pressure tank 27, it is passed through the cooler 26 for cooling the mixture.

After the CFC gas is separated from the air, it can be discharged via the CFC discharge conduit 30, and the air can be blown off via the blow-off conduit 28.

When the tapping of the fluid is completed, e.g., when a vacuum equal to the vacuum applied in the processing system has been generated in the container from which the fluid has been tapped, the valve 15 is closed. By opening the aeration valve 16, the vacuum drops in the area enclosed by the seal 3, and the tapping head 1 is no longer pressed against the wall.

When the oil in the separation tank 17 has reached a certain level, it can be discharged via the conduit 19 to the oil reservoir 23 by operating the aeration valve 20, the valve 21, and the oil pump 22.

To expedite the tapping step, the passage in the wall can be enlarged by means of the tapered part 13 of the drill 5 when the pressure behind the wall through which the fluid is tapped.

Another embodiment shown in FIG. 2 will hereinafter be described and explained, as far as it differs from the above-described embodiment.

Disposed within the seal 3 is an excess pressure seal 103 enclosing a discharge area. The excess pressure seal 103 is arranged in such a manner that it can be sealingly connected to a wall together with seal 3. The perforating means 4 are to be brought into a position extending through the discharge area. In the housing 2 of the tapping head 1 a fluid discharge conduit 111 is mounted in such a manner that it communicates with the discharge area enclosed by the excess pressure seal 103. An air discharge conduit 211 communicates with a part of the contact area enclosed by the seal 3, which part is located outside the excess pressure seal 103.

Incorporated into the fluid discharge conduit 111 is a filter 114 for collecting solids and a valve 115. The fluid discharge conduit 111 opens into a separation tank 117, into which the air discharge conduit 211 also opens. The air discharge conduit 211 is connected to an aeration valve 216 and extends from the tapping head 1 via a valve 215, a buffer tank 217, and a non-return valve 200. The separation tank 117 and the buffer tank 217 are respectively provided with an aeration valve 120 and 220. A conduit 219 for discharging leak-off oil extends from the buffer tank via a valve 222 to the oil discharge conduit 19.

For tapping a fluid through a wall the tapping head 1 is placed against a relevant wall portion of a container, like in the above-discussed embodiment, after which, by operating the valves 115 and 215, air is discharged from the area enclosed by the seal, so that a partial vacuum is generated in that area. If required, the valve 215 can be opened at a later stage. Since the seal 3 is compressed under the influence of the pressure force effected by the vacuum, the excess pressure seal 103 also reaches a sealing position contacting the wall.

When the tapping head 1 is held in position against the wall, a passage is provided in the wall by operating the perforating means 4. As soon as the passage has been formed, the fluid flowing through it causes the vacuum to be reduced only in the area enclosed by the excess pressure seal 103 where an excess pressure can be formed. The excess pressure seal 103, however, prevents the vacuum in the remaining area enclosed by the seal 3 from being reduced. Since the frontally projected surface area of the discharge area enclosed by the excess pressure seal 103 is relatively small when compared with the corresponding surface area of the remaining contact area enclosed by the seal 3, the pressure force caused by the vacuum in the contact area remains sufficiently higher than the force away from the wall effected by a temporary excess pressure prevailing in the discharge area.

A reliable fixation of the tapping head 1 during the formation of the passage is further realized since the non-return valve 200 prevents a decrease of the vacuum in the conduit 111 and in a portion of the conduit 211 connected to the the separation tank 117 from being passed on via the part situated on the other side of the valve 200 to the part of the contact area enclosed by the seal 3 located outside the discharge area.

If leakage develops along the excess pressure seal 103, the decrease of the vacuum is delayed during filling with fluid, since the buffer tank 217 communicating with the contact area forms an enlargement of the vacuumized volume.

Fluid flowed into the buffer tank 217 can also contain oil. The vacuum prevailing in the buffer tank will cause CFC gas to be released from the oil. The oil possibly accumulated in the buffer tank and released from CFC gas can be discharged via the conduit 219 for discharging leak-off oil by operating the valve 222. Preferably, the aeration valve 220 is operated to aerate the buffer tank 217.

Fluid discharged via the conduit 211 in case of leakage along the excess pressure seal 103 is treated in the same manner as fluid reaching the separation tank 117 via the fluid discharge conduit since the air discharge conduit 211 opens into the separation tank. Consequently, in case of leakage along the excess pressure seal 103 no CFC gas can escape from collection.

The separation tank 117, like the separation tank 17 according to the above-described embodiment, serves to separate oil from CFC gas and air. Instead of serving as a buffer to avoid an unduly large decrease of the vacuum in the contact area, the separation tank 117 may further form a buffer to avoid the occurrence of an unduly high excess pressure in the discharge area enclosed by the excess pressure seal 103.

What we claim is:

1. An apparatus for tapping a refrigerant gas through a comprising: a vacuum source (24), a tapping head (1) provided at the front thereof with a circumferential seal (3) for bounding a contact area of the wall, perforating means (4) to be brought into a position extending through the contact area for forming an opening in the wall, at least one conduit (11, 111, 211) communicating with a space bounded by the seal (3) and the contact area for discharging air from the space and for discharging refrigerant gas flowing through the opening, and separating means connected to said conduit and operative in response to said vacuum source for separating contaminants from the air and refrigerant gas so that the contaminants can be directed to a collection means, said separating means further comprises means for transforming the refrigerant gas to a pre-defined state so that the refrigerant gas and the air can be separately withdrawn and to substantially prevent the refrigerant gas from escaping to a surrounding atmosphere.

2. An apparatus according to claim 1, characterized in that substantially in central position of the contact area an internal circumferential excess pressure seal (103) bounding a discharge area is arranged in such a manner that it can be brought into a common sealing position contacting a wall with said seal (3), while the perforating means (4) can be brought into a position extending through the discharge area, and a fluid discharge conduit (111) communicates with the discharge area.

3. An apparatus according to claim 2, characterized in that an air discharge conduit (211) communicates with a portion of the contact area located outside the discharge area.

4. An apparatus according to claim 3, characterized in that both the air discharge conduit (211) and the fluid discharge conduit (111) are connected to the same fluid collecting system (2).

5. An apparatus according to claim 4, characterized in that a non-return valve (200) is incorporated into the air discharge conduit (211).

6. An apparatus according to claim 1, characterized in that the contact area and at least a space (17, 217) communicating therewith can form a buffer space for limiting the decrease of the vacuum when fluid flowed through the passage in the wall flows into said buffer space.

7. An apparatus according to claim 6, characterized in that the buffer tank (217) is provided with an aeration valve (220), while the lower portion of the buffer tank (217) communicates with a conduit (219), into which a valve (222) is incorporated, which conduit is connected to a liquid reservoir (23) via a liquid pump (22).

8. An apparatus according to claim 1, characterized in that the perforating means (4) are arranged for providing a passage in the wall that is very small as compared with the cross-section of the fluid discharge conduit.

9. An apparatus according to claim 8, characterized in that the perforating means (4) are arranged for enlarging the passage in the wall.

10. An apparatus according to claim 1, characterized in that a filter (14, 114) for collecting solids is incorporated into the fluid discharge conduit (11, 111).

11. An apparatus according to claim 1, characterized in that a valve (15, 115) is incorporated into the fluid discharge conduit (11, 111).

12. An apparatus according to claim 1, characterized in that a separation tank (17, 117) is incorporated into the fluid discharge conduit (11,111) between the tapping head (1) and the vacuum source (24), said separation tank being provided with an aeration valve (20, 120) having a conduit (19) connected to a low portion thereof, a valve (21) and a liquid pump (22) being incorporated into said conduit, said conduit (19) opening into a liquid reservoir (23).

13. An apparatus according to claim 12, characterized in that a gas discharge conduit (18) is connected to the separation tank (17, 117), into which conduit a vacuum pump (24), a compressor pump (25), and a cooler (26) are incorporated, which conduit (18) opens into a pressure tank (27) having a liquid discharge conduit (30) connected to the lower portion thereof and a blow-off conduit (28) connected to the upper portion thereof.

14. An apparatus according to claim 1, characterized in that the air discharge conduit (11, 211) communicates with an aeration valve (16, 216).

15. An apparatus according to claim 1, characterized in that a valve (15, 215) is incorporated into the air discharge conduit (11, 211).

16. An apparatus according to claim 1, characterized in that the fluid discharge conduit (111) and the air discharge conduit (211) communicate with one vacuum source (24).

17. An apparatus according to claim 5, characterized in that the buffer tank (217) is provided with an aeration valve (220), while the lower portion of the buffer tank (217) communicates with a conduit (219), into which a valve (222) is incorporated, which conduit is connected to a liquid reservoir (23) via a liquid pump (22).

18. An apparatus according to claim 1 wherein the refrigerant gas is a CFC gas.

19. An apparatus according to claim 1 wherein the pre-defined state is a liquid state.

* * * * *